(12) United States Patent
Yokoyama et al.

(10) Patent No.: US 11,904,882 B2
(45) Date of Patent: Feb. 20, 2024

(54) SETTING DEVICE, DISPLAY CONTROL DEVICE, AND VEHICLE DISPLAY CONTROL SYSTEM

(71) Applicant: TOYOTA JIDOSHA KABUSHIKI KAISHA, Aichi-ken (JP)

(72) Inventors: Daiki Yokoyama, Gotemba (JP); Yoshiyuki Kageura, Shizuoka-ken (JP); Masanori Shimada, Susono (JP); Yoshihiro Sakayanagi, Mishima (JP); Hiroki Morita, Hiratsuka (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 70 days.

(21) Appl. No.: 17/835,962

(22) Filed: Jun. 9, 2022

(65) Prior Publication Data
US 2022/0402518 A1    Dec. 22, 2022

(30) Foreign Application Priority Data
Jun. 17, 2021    (JP) .................................. 2021-101159

(51) Int. Cl.
*B60W 50/14*    (2020.01)
*B60L 53/66*    (2019.01)
(Continued)

(52) U.S. Cl.
CPC ............. *B60W 50/14* (2013.01); *B60K 35/00* (2013.01); *B60L 53/66* (2019.02); *H04W 4/021* (2013.01); *H04W 4/40* (2018.02); *H04W 4/90* (2018.02); *B60K 2370/166* (2019.05); *B60K 2370/1868* (2019.05); *B60K 2370/193* (2019.05);
(Continued)

(58) Field of Classification Search
CPC .. B60W 50/14; B60W 2050/146; H04W 4/90; H04W 4/40; H04W 4/021; B60L 53/66; B60L 2240/667; B60L 2250/16; B60L 2260/50; B60K 2370/195; B60K 2370/589; B60K 2370/166;
(Continued)

(56) References Cited

U.S. PATENT DOCUMENTS

| 9,301,088 B2 * | 3/2016 | Kirk ........................ H04W 4/02 |
| 2013/0113433 A1 * | 5/2013 | Shibata ................ G01R 31/392 320/134 |

(Continued)

FOREIGN PATENT DOCUMENTS

JP    201459200 A    4/2014

OTHER PUBLICATIONS

BMW Announces PHVs will be Equipped with Function to Automatically Switch to EV Mode in Electric Vehicle Exclusive Zone, URL: https://response.jp/article/2020/06/23/335863.html, Japan, Jun. 23, 2020, 7pp.

(Continued)

*Primary Examiner* — Zhen Y Wu
(74) *Attorney, Agent, or Firm* — HAUPTMAN HAM, LLP

(57) ABSTRACT

A setting device including a processor is provided. The processor is configured to, when occurrence of a secondary disaster is predicted after occurrence of a disaster, set a
(Continued)

region in which the secondary disaster is predicted to a charging-prohibited zone in which use of a charging facility for charging a battery installed in a vehicle is prohibited.

20 Claims, 8 Drawing Sheets

(51) Int. Cl.
*H04W 4/021* (2018.01)
*H04W 4/40* (2018.01)
*H04W 4/90* (2018.01)
*B60K 35/00* (2006.01)

(52) U.S. Cl.
CPC .... *B60K 2370/195* (2019.05); *B60K 2370/52* (2019.05); *B60K 2370/589* (2019.05); *B60L 2240/667* (2013.01); *B60L 2250/16* (2013.01); *B60L 2260/50* (2013.01); *B60W 2050/146* (2013.01)

(58) Field of Classification Search
CPC .......... B60K 2370/193; B60K 2370/52; B60K 2370/1868; B60K 35/00
USPC .......................................................... 340/435
See application file for complete search history.

(56) References Cited

U.S. PATENT DOCUMENTS

| | | | |
|---|---|---|---|
| 2017/0220086 A1* | 8/2017 | Suzuki | H02J 3/007 |
| 2019/0031183 A1* | 1/2019 | Lim | B60L 7/16 |
| 2019/0047431 A1* | 2/2019 | Iwashita | B60L 53/32 |
| 2019/0369623 A1* | 12/2019 | Sadakiyo | G05D 1/0214 |
| 2020/0047636 A1* | 2/2020 | Takehara | B60L 5/005 |
| 2020/0235602 A1* | 7/2020 | Hishida | H02J 3/322 |
| 2021/0376402 A1* | 12/2021 | Tsuchiya | B60L 53/53 |

OTHER PUBLICATIONS

Ford Study Shows Blockchain, Dynamic Geofencing and Plug-In Hybrid Vans Can Help Improve Urban Air Quality, URL: https://media.ford.com/content/fordmedia/feu/en/news/2020/12/17/ford-study-shows-blockchain---dynamic-geofencing-and-plug-in-hybr.html, Germany, Dec. 17, 2020, 3pp.

Geofencing Service Provided by Mercedes, URL: https://faq.mercedes-benz.co.jp/faq/show/23479?category_id=194&site_domain=default, Japan, 3pp.

Provide Contextual Experiences When Users Enter or Leave an Area of Interest, URL: https://developers.google.com/location-context/geofencing, 2pp.

* cited by examiner

| POWER FEEDING DEVICE A | 15km |
|---|---|
| POWER FEEDING DEVICE B | 21km |
| POWER FEEDING DEVICE C | 13km |
| ⋮ | ⋮ |

SETTING DEVICE, DISPLAY CONTROL DEVICE, AND VEHICLE DISPLAY CONTROL SYSTEM

CROSS-REFERENCE TO RELATED APPLICATION

This application claims priority to Japanese Patent Application No. 2021-101159 filed on Jun. 17, 2021, incorporated herein by reference in its entirety.

BACKGROUND

1. Technical Field

The present disclosure relates to a setting device, a display control device, and a vehicle display control system.

2. Description of Related Art

Japanese Unexamined Patent Application Publication No. 2014-59200 (JP 2014-59200 A) describes a navigation device that includes tsunami information acquisition means, guidance means, and notification means, and performs guidance to a destination at which a tsunami can be avoided, based on the tsunami information and the position of the vehicle.

SUMMARY

Now, when a vehicle travels under power of an electric motor, it may be necessary to charge the vehicle depending on remaining charge of a battery. There is demand for suppressing situations of being engulfed by a disaster, when attempting to charge at the time of fleeing the disaster.

The present disclosure provides a setting device, a display control device, and a vehicle display control system.

A setting device according to a first aspect of the disclosure includes a processor. The processor is configured to, when occurrence of a secondary disaster is predicted after occurrence of a disaster, set a region in which the secondary disaster is predicted to a charging-prohibited zone in which use of a charging facility for charging a battery installed in a vehicle is prohibited.

According to such a configuration, a driver or the like can be restrained from staying in the region where occurrence of the secondary disaster is predicted to charge the battery.

In the setting device according to the first aspect, the setting device may further include a transmitting circuit, and the processor may be configured to control the transmitting circuit to transmit information regarding the charging-prohibited zone to the vehicle.

Also, the processor may be configured to control the transmitting circuit to transmit information regarding the charging-prohibited zone to a vehicle management server that manages a plurality of the vehicles.

In the setting device according to the first aspect, the processor may be configured to set the charging-prohibited zone in a geofencing zone in which traveling of the vehicle is restricted to traveling under power of a motor driven by the battery installed in the vehicle.

In the setting device according to the first aspect, the processor may be configured to set the charging-prohibited zone when prediction is made for occurrence of water damage due to a traveling lane in which the vehicle travels being flooded as the secondary disaster.

Also, a display control device according to a second aspect of the disclosure is configured to control display content of a display device installed in a vehicle. The display control device includes a processor. The processor is configured to control the display content displayed on the display device regarding information of, out of charging facilities for charging a battery installed in the vehicle, one or more of the charging facilities that are located in a charging-prohibited zone set in a region where occurrence of a secondary disaster is predicted after a disaster occurs.

According to such a configuration, the display content on the display device installed in the vehicle can be controlled regarding the charging facility installed in the region where occurrence of the secondary disaster is predicted. Consequently, a driver or the like can be restrained from staying in the region where the occurrence of the secondary disaster is predicted to charge the battery.

In the display control device according to the second aspect, the processor may be configured to control the display device such that the information of the one or more of the charging facilities that are located in the charging-prohibited zone is hidden from display in map information displayed by the display device. Such a configuration makes it difficult for a driver or the like of the vehicle to confirm the charging facility located in the charging-prohibited zone by the map information. Consequently, the driver or the like can be restrained from staying in the region where the occurrence of the secondary disaster is predicted to charge the battery.

In the display control device according to the second aspect, the processor may be configured to control the display device such that information indicating prohibition of use is additionally displayed upon the information of the one or more of the charging facilities that are located in the charging-prohibited zone.

In the display control device according to the second aspect, the processor may be configured to control the display device such that information of the charging facilities is displayed in a list on the display device in descending order of safety.

In the display control device according to the second aspect, the charging-prohibited zone may be set in a geofencing zone in which traveling of the vehicle is restricted to traveling under power of the motor driven by the battery installed in the vehicle.

Also, a vehicle display control system according to a third aspect of the disclosure is configured to control display content of a display device installed in a vehicle. The vehicle display control system includes a setting device and a display control device. The setting device includes a first processor configured to, when occurrence of a secondary disaster is predicted after occurrence of a disaster, set a region in which the secondary disaster is predicted to a charging-prohibited zone in which use of a charging facility for charging a battery installed in the vehicle is prohibited. The display control device includes a second processor configured to control the display content regarding information of, out of charging facilities for charging the battery installed in the vehicle, one or more of the charging facilities that are located in the charging-prohibited zone.

According to such a configuration, the display content on the display device installed in the vehicle can be controlled regarding the charging facility installed in the region where occurrence of the secondary disaster is predicted. Consequently, the driver or the like can be restrained from staying in the region where the occurrence of the secondary disaster is predicted to charge the battery.

In the vehicle display control system according to the third aspect, the second processor may be configured to control the display device such that the information of the one or more of the charging facilities that are located in the charging-prohibited zone is hidden from display in map information displayed by the display device. Such a configuration makes it difficult for a driver or the like of the vehicle to confirm the charging facility located in the charging-prohibited zone by the map information. Consequently, the driver or the like can be restrained from staying in the region where the occurrence of the secondary disaster is predicted to charge the battery.

In the vehicle display control system according to the third aspect, the second processor may be configured to control the display device such that information indicating prohibition of use is additionally displayed upon the information of one or more of the charging facilities that are located in the charging-prohibited zone.

In the vehicle display control system according to the third aspect, the second processor may be configured to control the display device such that information of the charging facilities is displayed in a list on the display device in descending order of safety.

In the vehicle display control system according to the third aspect, the first processor may be configured to set the charging-prohibited zone in a geofencing zone in which traveling of the vehicle is restricted to traveling under power of a motor driven by the battery installed in the vehicle.

In the vehicle display control system according to the third aspect, the display control device may be provided in the vehicle. Also, the setting device may include a transmitting circuit, and the first processor may be configured to control the transmitting circuit to transmit information regarding the charging-prohibited zone to the display control device.

In the vehicle display control system according to the third aspect, the vehicle display control system may further include a vehicle management server that manages a plurality of the vehicles. The display control device may be provided in the vehicle management server. Also, the setting device may include a transmitting circuit, and may be configured to control the transmitting circuit to transmit information regarding the charging-prohibited zone to the vehicle management server. The vehicle management server may be configured to transmit a signal for controlling the display content of the display device of each vehicle of the vehicles to be managed.

According to such a configuration, the display control device provided to the vehicle management server collectively performs control of display content regarding charging facilities for multiple vehicles, and accordingly there is no need for each vehicle to execute the processing for display control. As a result, the processing load of the vehicles can be reduced.

In the vehicle display control system according to the third aspect, the first processor may be configured to set the charging-prohibited zone when prediction is made for occurrence of water damage due to a traveling lane in which the vehicle travels being flooded as the secondary disaster. Further, the secondary disaster may be a tsunami, and the first processor may be configured to set the charging-prohibited zone so as to include a region where the tsunami is expected to reach.

In the vehicle display control system according to the third aspect, the vehicle may be configured to include an internal combustion engine and a motor driven by the battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described below with reference to the drawings. Note that in all of the drawings in the following embodiments, portions that are the same or equivalent are denoted by the same signs. Further, the present disclosure is not limited by the embodiments described below.

First Embodiment

Figure 1:
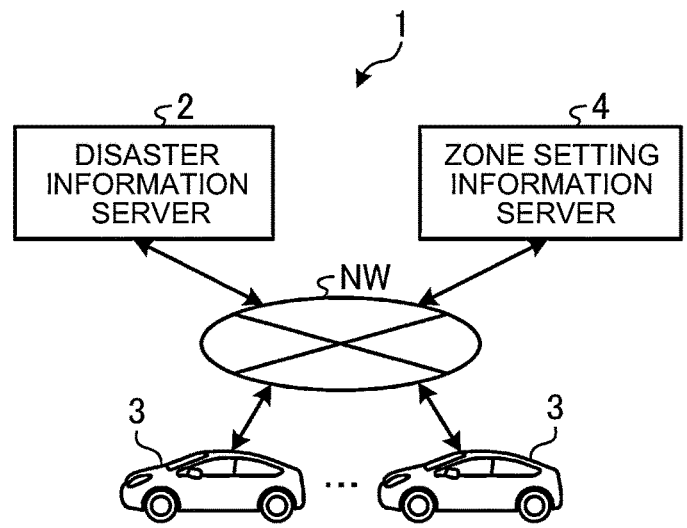
FIG. 1 is a diagram schematically illustrating a control system according to a first embodiment.
Figure 2:
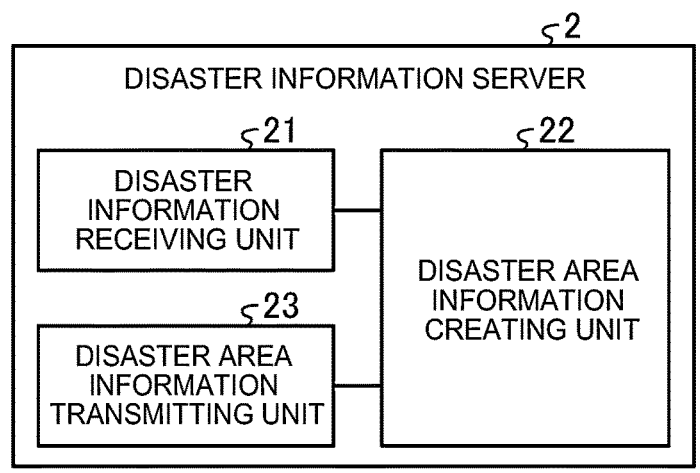
FIG. 2 is a block diagram for describing a configuration of a disaster information server according to the first embodiment.
Figure 3:
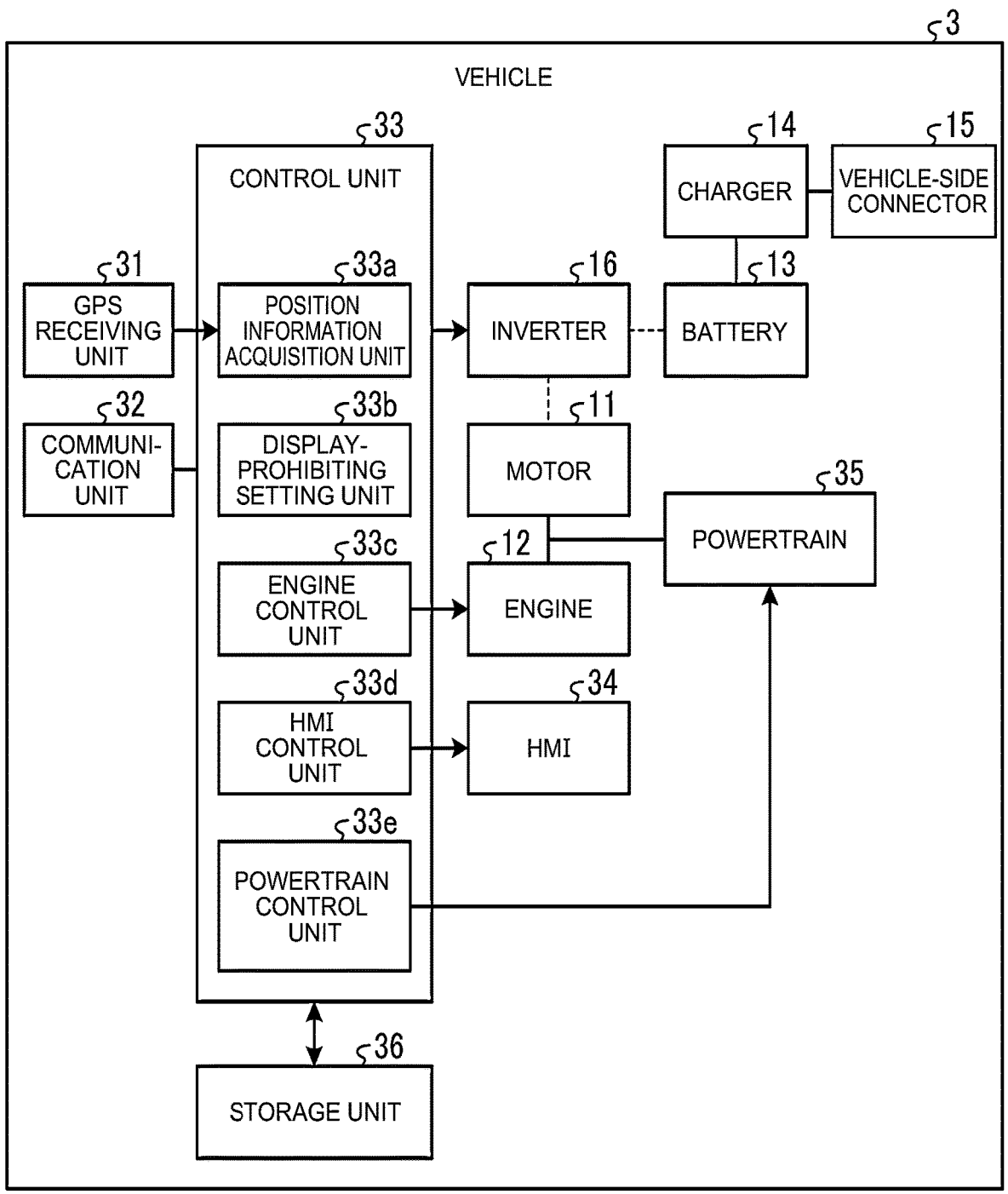
FIG. 3 is a block diagram for describing a configuration of a vehicle according to the first embodiment.
Figure 4:
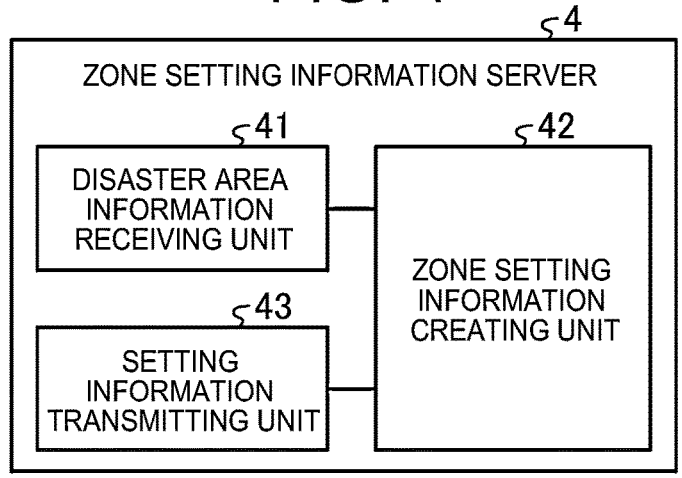
FIG. 4 is a block diagram for describing a configuration of a zone setting information server according to the first embodiment.

FIG. 1 is a diagram schematically illustrating a control system according to a first embodiment. FIG. 2 is a block diagram for describing a configuration of a disaster information server according to the first embodiment. FIG. 3 is a block diagram for describing a configuration of a vehicle according to the first embodiment. FIG. 4 is a block diagram for describing a configuration of a zone setting information server according to the first embodiment.

A control system 1 according to the first embodiment includes a disaster information server 2, vehicles 3, and a zone setting information server 4. When a disaster occurs, the disaster information server 2 transmits information regarding the disaster. The vehicles 3 are, for example, vehicles that can travel only under the power of an electric motor alone (capable of electric vehicle (EV) mode), such as a plug-in hybrid electric vehicle or a range extender vehicle. Also, the vehicles 3 are vehicles that are capable of being charged by electric power from an external electric power source, and of externally supplying electric power.

The disaster information server 2, the vehicles 3, and the zone setting information server 4 can perform communication of information over a network NW. Examples of the network NW include an Internet-related network and so forth. The disaster information server 2 can exchange information with multiple vehicles 3.

The disaster information server 2 includes a disaster information receiving unit 21, a disaster area information creating unit 22, and a disaster area information transmitting unit 23. The disaster information server 2 includes a processor having hardware such as a central processing unit (CPU), and a storage unit such as random-access memory (RAM) and read-only memory (ROM).

The disaster information receiving unit 21 receives disaster information indicating that a disaster has occurred. A disaster is a situation in which damage occurs in a certain area due to a natural phenomenon or a human-induced cause. Examples of disaster information include earthquake information, tsunami information, storm information, heavy rain information, flood information, volcano eruption information, structure fire information, wildfire information, power outage information, and so forth. When an earthquake strikes, for example, the disaster information receiving unit 21 receives signals transmitted from seismographs installed at various observation points (signals generated by detecting tremors), information regarding whether a tsunami might occur, and regarding the scale thereof. Also, the disaster information receiving unit 21 is not limited to receiving seismograph and tsunami information, and may also receive disaster information from various types of equipment and servers over the network NW. Further, after receiving the information regarding the initial report of the disaster occurring, the disaster information receiving unit 21 continues to receive newly-arriving information, such as the scale of the disaster, as follow-up reports.

The disaster area information creating unit 22 creates disaster area information based on the disaster information. The disaster area information includes disaster-affected area information indicating the area where the disaster occurred and information indicating the scale of the disaster. When a tsunami occurs, for example, the disaster area information creating unit 22 creates disaster area information in which the predicted extent of reach of the tsunami is set as the disaster area. The range of this disaster area can be set in increments of predetermined areas, such as states, counties, municipalities, and so forth. Also, the disaster area information creating unit 22 constantly updates the disaster area information with the latest information, based on follow-up reports received after the disaster occurs.

The disaster area information transmitting unit 23 transmits the disaster area information that is created. The disaster area information transmitting unit 23 transmits the disaster area information to the zone setting information server 4 over the network NW. Also, the disaster area information transmitting unit 23 transmits the latest disaster area information every time the disaster area information is updated with the latest information. The disaster area information transmitting unit 23 may transmit the disaster area information to the vehicles 3 over the network NW.

The zone setting information server 4 includes a disaster area information receiving unit 41, a zone setting information creating unit 42, and a setting information transmitting unit 43. The zone setting information server 4 includes a processor including hardware such as a CPU, and a storage unit such as RAM, ROM, and so forth. The zone setting information server 4 includes a first processor.

The disaster area information receiving unit 41 receives disaster area information including information regarding a tsunami, for example, from the disaster information server 2.

Based on the disaster area information, the zone setting information creating unit 42 sets a zone in which damage is predicted or a zone in which damage has been inflicted, as a charging-prohibited zone in which use of the power feeding devices located in the zone is prohibited, and create setting information regarding the zone that has been set. The setting information includes map information and coordinate information regarding the charging-prohibited zone that has been set. Note that the setting information may further include information regarding prohibition of use of the power feeding device located in the charging-prohibited zone.

The setting information transmitting unit 43 transmits the setting information that is created. The setting information transmitting unit 43 transmits the setting information to each vehicle 3 over the network NW.

Now, the charging-prohibited zone is a region in which a virtual fence (virtual boundary) called a geofence is set within a predetermined district (geofencing zone). The geofencing zone is set in particular districts, such as an urban area in a city, for example. Within the geofencing zone, particular vehicle control is performed for the vehicles 3 located in the geofencing zone. This vehicle control includes a drive control that prohibits engine drive, so that the vehicle travels only under the power of a motor (EV mode).

The vehicles 3 are electrified vehicles, each including a motor 11 for traveling, an engine 12, a battery 13, a charger 14, a vehicle-side connector 15, and an inverter 16.

The motor 11 is a power source for traveling. Further, the engine 12 can rotate the motor 11. That is to say, the motor 11 can generate electricity by the power of the engine 12. When the motor 11 generates electricity by the engine 12, the battery 13 can be charged with the electric power generated by the motor 11. The motor 11 is electrically connected to the battery 13 through the inverter 16.

The vehicle 3 is a plug-in hybrid electric vehicle including the charger 14 and the vehicle-side connector 15, for charging the battery 13 with external electric power.

The battery 13 is a power storage device that stores electric power to be supplied to the motor 11 and also stores electric power supplied from an external electric power source. The battery 13 is electrically connected to the vehicle-side connector 15 through the charger 14. The charger 14 charges the battery 13 with external electric power. For example, the charger 14 includes various types of relay portions. The battery 13 and the vehicle-side connector 15 can be electrically disconnected by opening a relay portion of the charger 14. When charging the battery 13 with external electric power, the relay portion of the charger 14 is closed, and the battery 13 and the vehicle-side connector 15 are electrically connected. The vehicle-side connector 15 can be connected to an external-side connector such as a charging connector of a charging stand.

Further, the vehicles 3 each include a Global Positioning System (GPS) receiving unit 31, a communication unit 32, a control unit 33, a human-machine interface (HMI) 34, a powertrain 35, and a storage unit 36.

The GPS receiving unit 31 receives radio waves (signals) from GPS satellites.

The communication unit 32 exchanges information with the disaster information server 2 and the zone setting information server 4. The communication unit 32 receives disaster information from the disaster information server 2 and also receives setting information from the zone setting information server 4, for example. Also, the communication unit 32 transmits the position information indicating the current position of the vehicle 3 to the disaster information server 2.

The control unit 33 includes a processor that has hardware such as a CPU, and a storage unit such as RAM, ROM, and so forth. The control unit 33 includes a position information acquisition unit 33a, a display-prohibiting setting unit 33b, an engine control unit 33c, an HMI control unit 33d, and a powertrain control unit 33e. The vehicles 3 each include a second processor.

The position information acquisition unit 33a acquires the current position information, based on the signals received by the GPS receiving unit 31.

The display-prohibiting setting unit 33b sets the information to be displayed on the HMI 34 based on the setting information acquired from the zone setting information server 4. Specifically, the display-prohibiting setting unit 33b performs settings such that power feeding devices installed in the charging-prohibited zone are not displayed on the HMI 34.

The engine control unit 33c controls the engine 12. For example, when a driving-prohibited instruction regarding the engine 12 is received, the engine control unit 33c executes prohibition control for prohibiting driving of the engine 12. Also, when a driving-permitted instruction regarding the engine 12 is received, the engine control unit 33c executes permission control for permitting driving of the engine 12.

The HMI control unit 33d controls the HMI 34. The HMI 34 is made up of an automotive navigation system, for example. The HMI 34 is an in-vehicle device that functions not only as a display unit for displaying information to a driver or the like, but also as an operating unit for receiving operations from the driver or the like. The HMI control unit 33d controls the HMI 34 so that the HMI 34 notifies the driver or the like of the vehicle 3 of information that, for example, the vehicle 3 is in a control state in which driving of the engine 12 is permitted or prohibited, or a control state in which driving of the engine 12 is prohibited. Further, the HMI control unit 33d controls the HMI 34 so as not to display facilities or the like of which displaying is prohibited in accordance with the information set by the display-prohibiting setting unit 33b.

The powertrain control unit 33e controls the powertrain 35. The powertrain 35 is a power transmission device that transmits power output from the motor 11 and the engine 12 to driving wheels. The powertrain 35 includes an automatic transmission and so forth. Accordingly, the powertrain control unit 33e executes gearshift control for controlling the shift stage of the automatic transmission.

The storage unit 36 is configured using a computer-readable recording medium, and various types of programs and various types of data are stored in a writable and readable manner. The recording medium includes a storage medium such as a hard disk, semiconductor memory, an optical disk, flash memory, and a magnetic disk, and a drive device for these storage media. The storage unit 36 stores programs, such as an operating system (OS) and various applications, necessary for the control unit 33 to comprehensively control the operation of each unit of the vehicle 3.

Also, the control unit 33 controls the motor 11 by controlling the inverter 16. Switching control of the inverter 16 is performed by the control unit 33. Further, opening/closing control of the relay portion of the charger 14 is performed by the control unit 33. That is to say, the control unit 33 executes charge control for charging the battery 13 with external electric power, and also executes discharge control for externally supplying the electric power stored in the battery 13. Also, the control unit 33 executes various types of control related to the vehicle 3.

Figure 5:
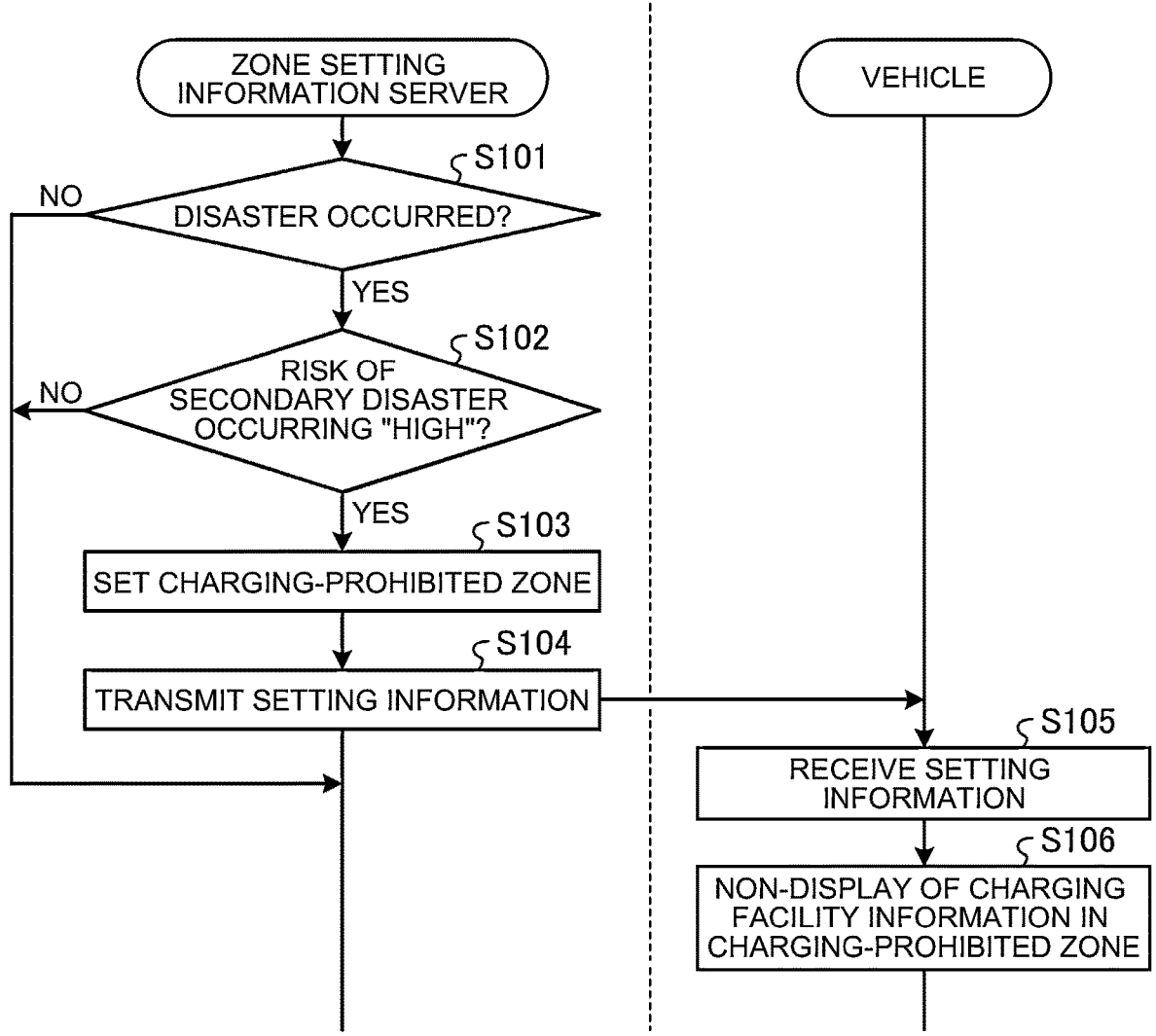
FIG. 5 is a sequence diagram showing an example of zone setting control processing according to the first embodiment.
Figure 6:
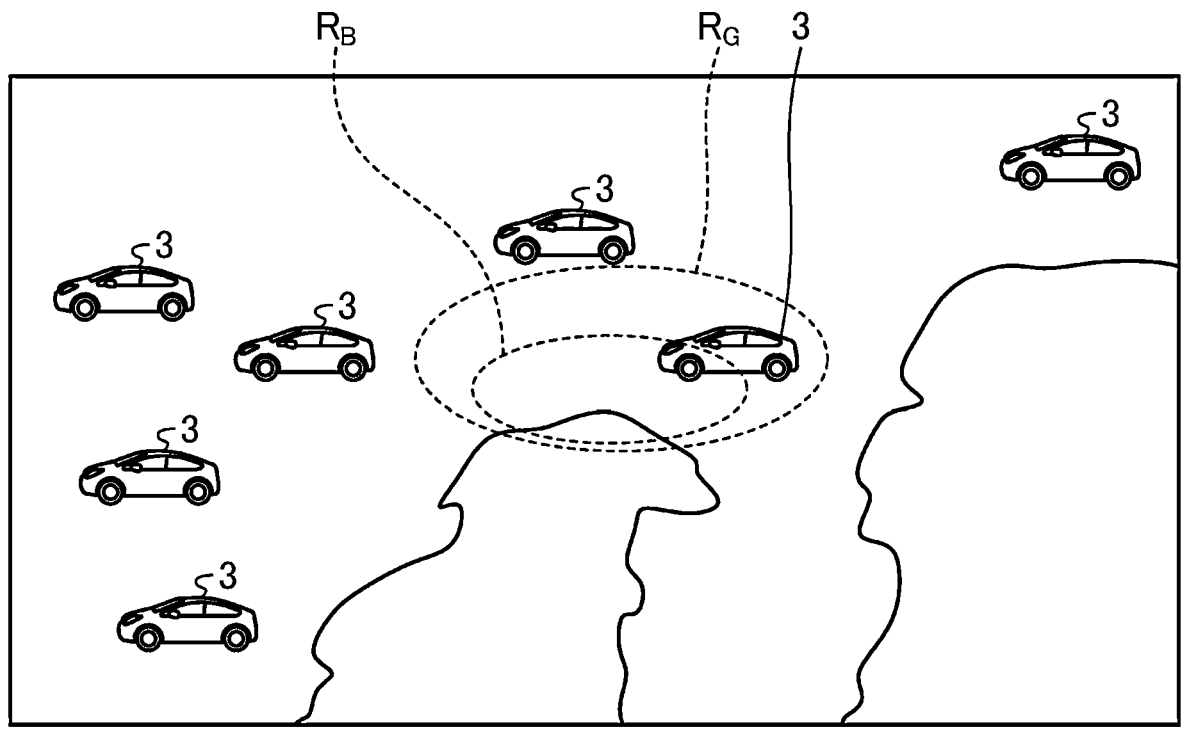
FIG. 6 is a diagram for describing a charging-prohibited zone.

Now, the control executed by each of the control unit 33 of each vehicle 3, and the zone setting information creating unit 42 of the zone setting information server 4, will be described with reference to FIGS. 5 and 6. FIG. 5 is a sequence diagram showing an example of zone setting control processing according to the first embodiment. Note that the control shown in FIG. 5 is repeatedly executed by the control unit 33 when information regarding a tsunami is transmitted as disaster information, for example. This control is not limited to the occurrence of a tsunami, and can also be applied to situations in which secondary disaster can be predicted such as water damage due to the driving lane where the vehicle 3 is traveling being flooded, damage due to rocks, soil, and so forth accumulating on the driving lane, due to landslide disasters, flooding from torrential rains, ash-fall from volcanic eruptions, and so forth.

The zone setting information creating unit 42 determines whether disaster area information has been received from the disaster information server 2 (step S101). When the zone setting information creating unit 42 has not received disaster area information (No in step S101), the processing ends. Note that checking for disaster area information is performed out regularly. On the other hand, when the zone setting information creating unit 42 has received disaster area information (Yes in step S101), determination is made that a disaster has occurred, and the flow advances to step S102.

In step S102, the zone setting information creating unit 42 determines whether risk of a secondary disaster is high. When the zone setting information creating unit 42 does not have information that a new disaster will occur following the disaster occurring, as disaster area information, for example, i.e., when determination is made that the risk of secondary disaster occurring is low (No in step S102), the processing is ended. On the other hand, when the zone setting information creating unit 42 has information that a new disaster may occur after the disaster occurs, i.e., when determination is made that the risk of secondary disaster occurring is high (Yes in step S102), the flow advances to step S103. A case in which disaster area information is created that there is a high possibility that a tsunami will occur after an earthquake, as a secondary disaster risk, will be described here. The level of the secondary disaster risk is determined by whether a tsunami occurs, for example. Alternatively, the risk of a secondary disaster may be quantified, and a threshold value may be set for distinguishing the level of the risk.

In step S103, the zone setting information creating unit 42 sets a charging-prohibited zone based on the disaster area information. FIG. 6 is a diagram for describing a charging-prohibited zone. For example, the zone setting information creating unit 42 sets a region in the geofencing zone $R_G$ illustrated in FIG. 6, including a region where a tsunami is predicted to reach, as a charging-prohibited zone $R_B$. This charging-prohibited zone $R_B$ is a region in which driving prohibition of the engine 12 is instructed, and displaying of power feeding devices is hidden from view on the HMI 34. The zone setting information creating unit 42 creates setting information regarding the charging-prohibited zone that is set.

In step S104, the setting information transmitting unit 43 transmits the setting information that is created to the vehicles 3. The control unit 33 then receives the setting information (step S105).

The display-prohibiting setting unit 33b sets the display of charging facility information (power feeding devices here, for example) in the region corresponding to the charging-prohibited zone to be hidden from display in the map information displayed on the HMI 34, in accordance with the setting information (step S106). The HMI control unit 33d controls the HMI 34 in accordance with the settings of the display-prohibiting setting unit 33b. Accordingly, the power feeding devices located in the region corresponding to the charging-prohibited zone cannot be visually recognized on the HMI 34.

Figure 7A:
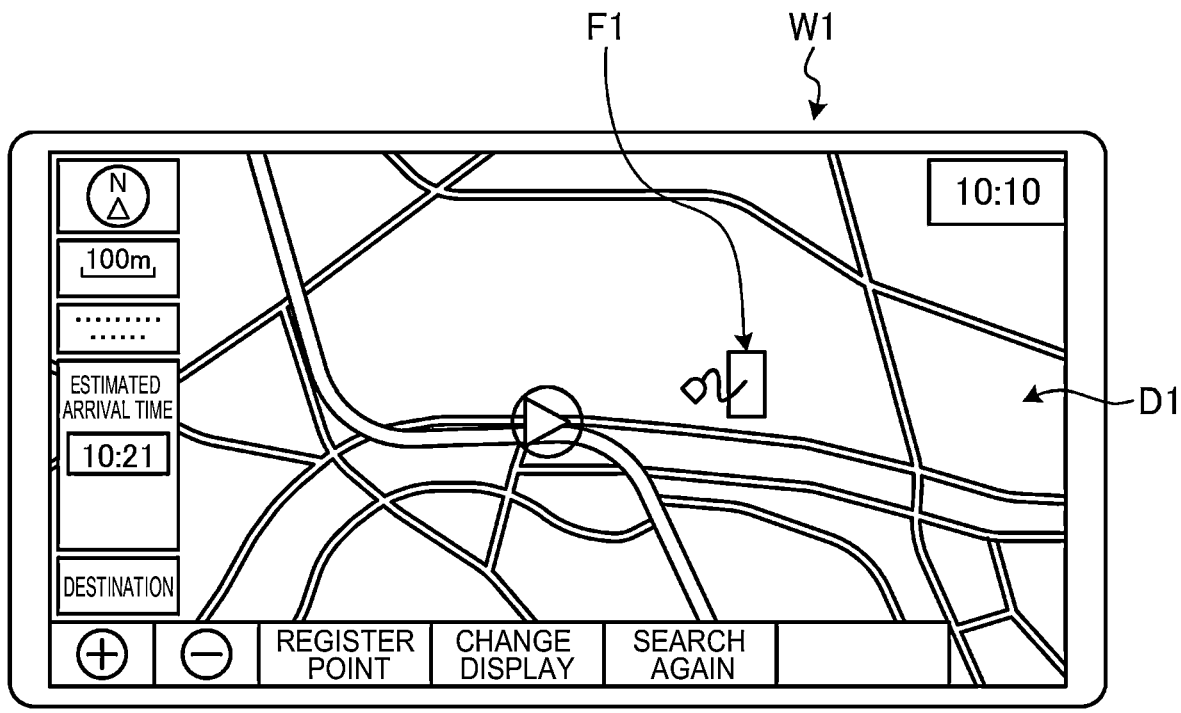
FIG. 7A is a diagram for describing display of map information when no charging-prohibited zone is set.
Figure 7B:
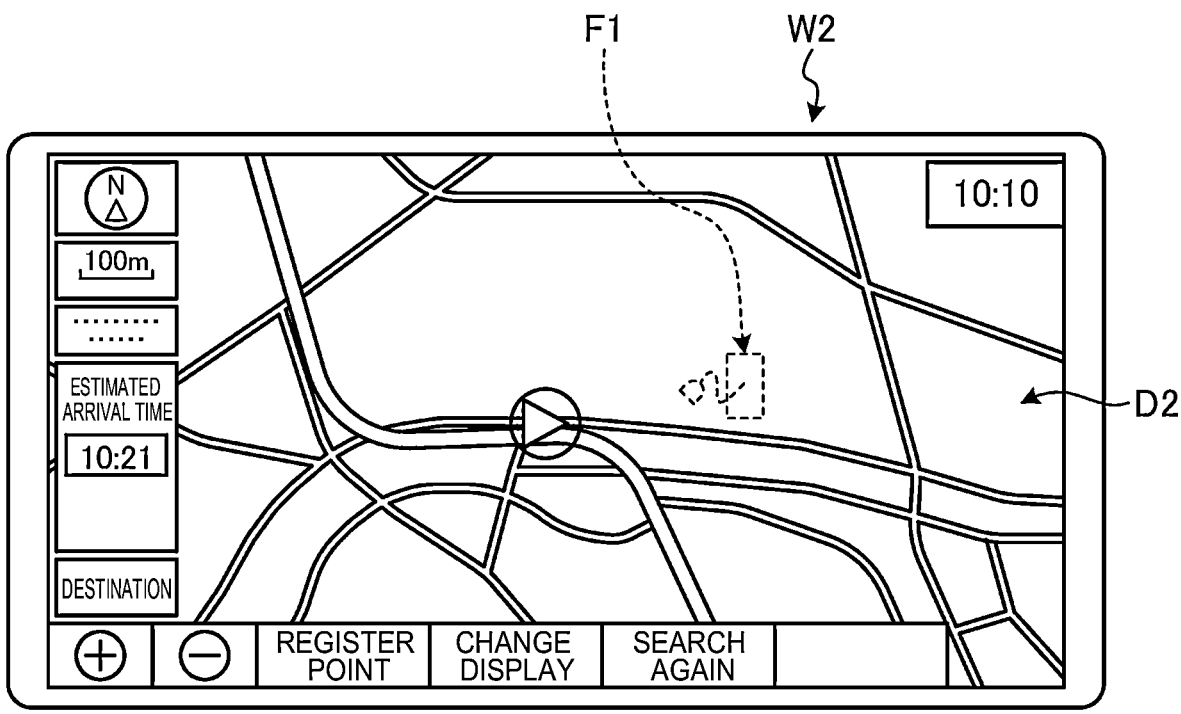
FIG. 7B is a diagram for describing display of map information when a charging-prohibited zone is set.

FIGS. 7A and 7B are diagrams for describing the display of map information in a charging-prohibited zone. FIG. 7A illustrates an example of map information displayed on a monitor W1 when no charging-prohibited zone is set. FIG. 7B illustrates an example of map information displayed on a monitor W2 when a charging-prohibited zone is set. FIGS. 7A and 7B illustrate map information at the same position as each other. Note that while a power feeding device F1 is illustrated by a dashed line for the sake of description in FIG. 7B, it is to be understood that this is not actually displayed. When no charging-prohibited zone is set (see FIG. 7A), the installation position of the power feeding device F1 is displayed in the map information D1 that displays roads, various types of facilities, and so forth. On the other hand, when a charging-prohibited zone is set (see FIG. 7B), the power feeding device F1 is hidden from display in the map information D2. Although the stationary power feeding device F1 has been described as an example in FIGS. 7A and 7B, information regarding power feeding devices provided within traveling lanes, and charging facilities such as a store or the like that handles other charging-related equipment may be hidden from display.

Figures 8, 9:
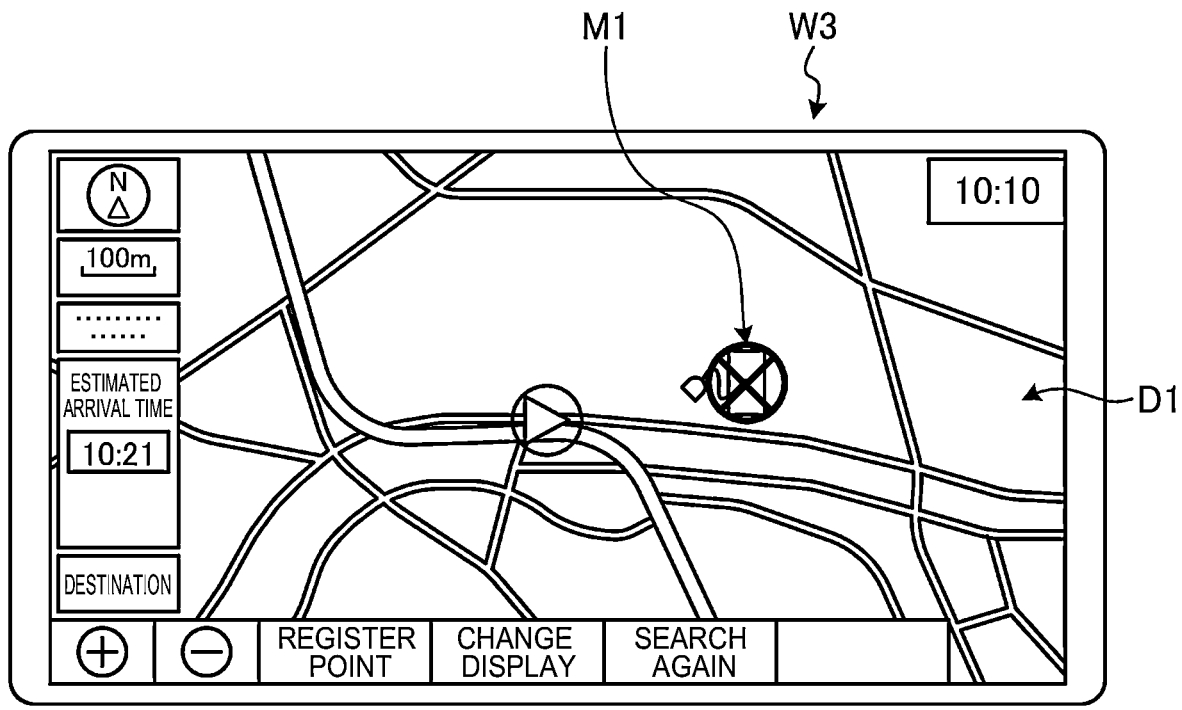
FIG. 8 is a diagram for describing another example (No. 1) of displaying map information regarding a charging-prohibited zone.
FIG. 9 is a diagram for describing another example (No. 2) of displaying map information regarding a charging-prohibited zone.

Note that in addition to the control of hiding from display the power feeding device F1 located in the charging-prohibited zone as described with reference to FIG. 7B, other display control may be performed. FIGS. 8 and 9 are diagrams for describing other examples of displaying map information regarding a charging-prohibited zone. For example, the HMI control unit 33d may superimpose an image M1 indicating prohibition on the power feeding device F1 of which use is prohibited, in the map information D1 displayed on the monitor W3 (see FIG. 8), or may list, in descending order of safety, power feeding devices located in a predetermined range, out of power feeding devices of which use is not prohibited (see FIG. 9). Here, the predetermined range is, for example, the distance to empty that is calculated from the remaining charge of the battery. Also, safety is a quantized value of the level of the risk of secondary disasters, and the degree of the level. The level of risk of a secondary disaster is determined based on the distance from the arrival position of the tsunami, and the altitude above sea level.

In the first embodiment described above, the power feeding devices in the region corresponding to the zone (here, the charging-prohibited zone) set in accordance with the risk of damage are hidden from display on the HMI 34, so that the driver or the like does not recognize the power feeding devices in this zone. According to the first embodiment, in a zone where there is a danger of a tsunami, for example, the driver or the like can be kept from staying in the zone due to stopping the vehicle 3 for charging. As a result, a situation of becoming engulfed while charging the battery when a disaster occurs can be suppressed.

Second Embodiment

Figure 10:
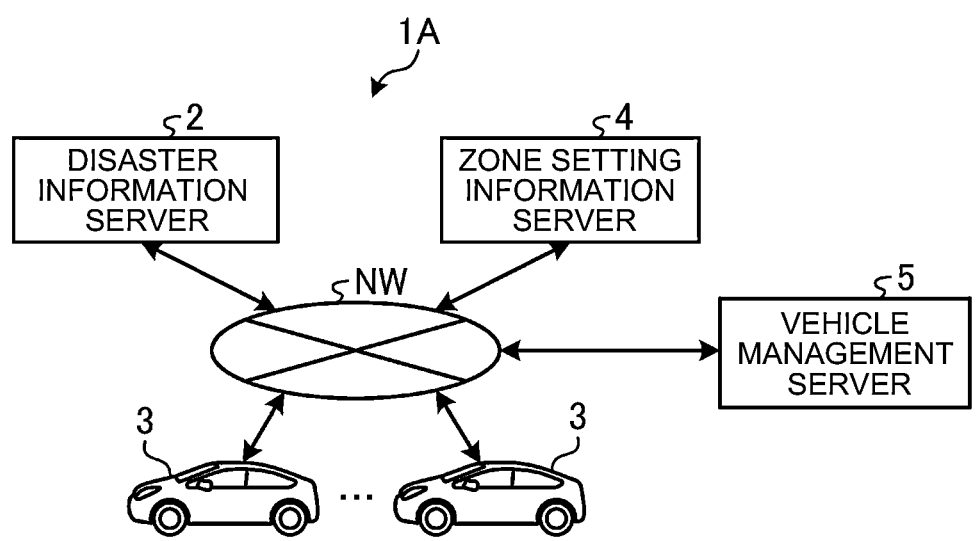
FIG. 10 is a diagram schematically illustrating a control system according to a second embodiment.
Figure 11:
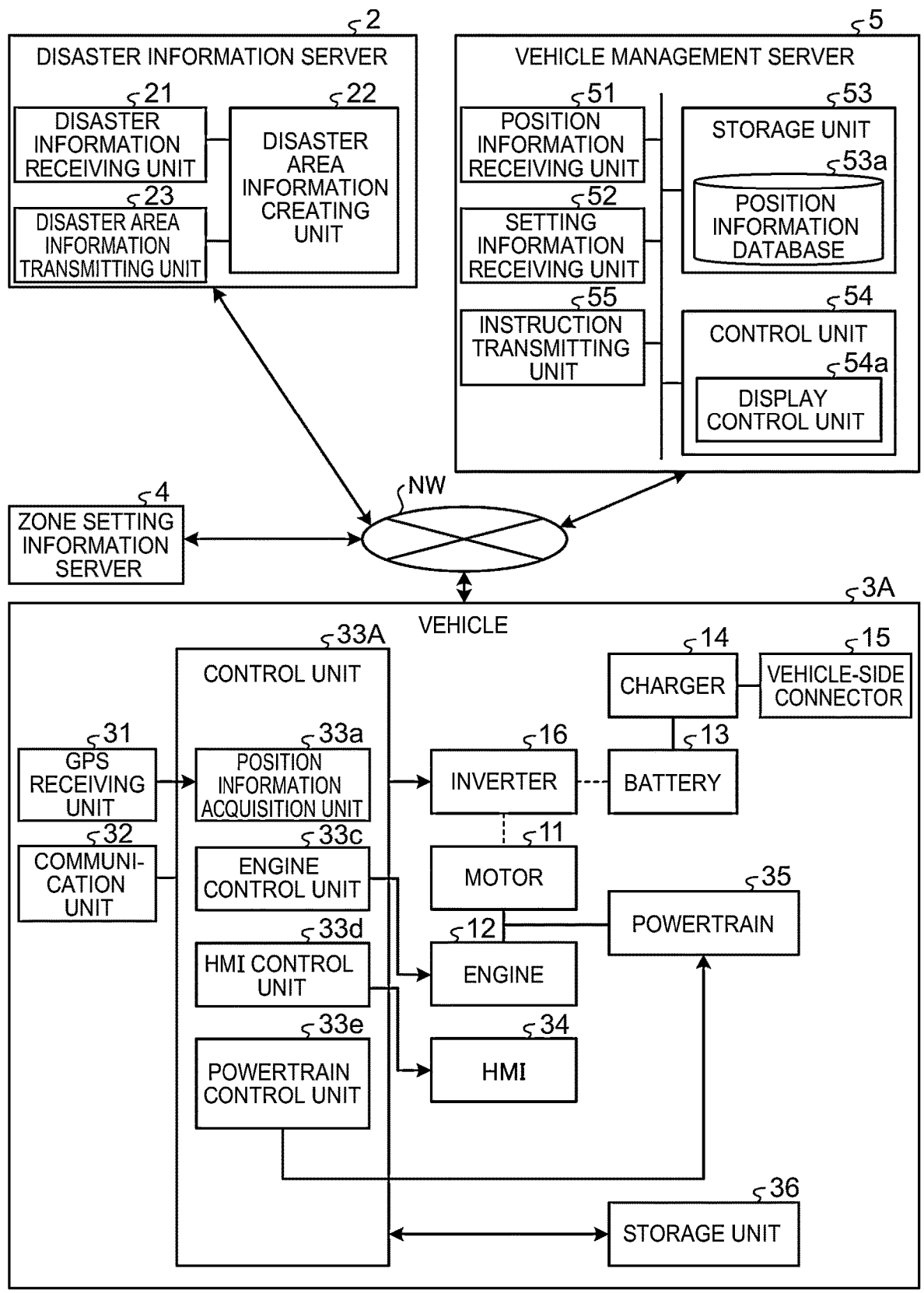
FIG. 11 is a block diagram for describing a configuration of the control system according to the second embodiment.

Next, a second embodiment will be described. FIG. 10 is a diagram schematically illustrating a control system according to the second embodiment. FIG. 11 is a block diagram for describing a configuration of the control system according to the second embodiment. In comparison with the configuration of the control system 1 according to the first embodiment, a control system 1A according to the second embodiment includes vehicles 3A instead of the vehicles 3, and further includes a vehicle management server 5. Hereinafter, portions that are different from the first embodiment (configuration and processing contents of the vehicle 3A and the vehicle management server 5) will be described.

The control system 1A includes the disaster information server 2, the vehicles 3A, the zone setting information server 4, and the vehicle management server 5. In comparison with the configuration of the vehicle 3, the vehicle 3A includes a control unit 33A that does not have the display-prohibiting setting unit 33b.

The vehicle management server 5 is a server installed in a vehicle management center. The vehicle management center monitors position information of a plurality of the vehicles 3A in real time.

Information communication can be performed between the disaster information server 2 and the vehicle management server 5 over the network NW. Examples of the network NW include an Internet-related network and so forth. Also, the vehicle 3A and the vehicle management server 5 can wirelessly communicate over the network NW.

The vehicle management server 5 includes a position information receiving unit 51, a setting information receiving unit 52, a storage unit 53, a control unit 54, and an instruction transmitting unit 55.

The position information receiving unit 51 receives the current position information transmitted from the vehicle 3A. The vehicle management server 5 can receive the position information of the vehicle 3A transmitted from multiple vehicles 3A by the position information receiving unit 51.

The setting information receiving unit 52 receives the setting information transmitted from the zone setting information server 4. The setting information receiving unit 52 can communicate with the setting information transmitting unit 43 over the network NW.

The storage unit 53 stores various types of information for managing the vehicle 3A. For example, the storage unit 53 stores information regarding a district in which a geofencing zone is set. This geofencing information is information stored in advance. The storage unit 53 also includes a position information database 53a.

The position information database 53a stores the position information of the vehicle 3A. Position information of the multiple vehicles 3A is stored in the position information database 53a in real time, based on the position information received by the position information receiving unit 51. That is to say, the position information stored in the position information database 53a is updated to the latest position information at all times.

The control unit 54 includes a processor including hardware such as a CPU and so forth. The control unit 54 also has a display control unit 54a.

The control unit 54 identifies the vehicles 3A located in the geofencing zone. For example, the control unit 54 identifies vehicles 3A located in the geofencing zone based on the geofencing information stored in the storage unit 36 and the position information stored in the position information database 53a. The control unit 54 executes particular vehicle control (control program) for the identified vehicles 3A.

The instruction transmitting unit 55 transmits a control instruction to the vehicle 3A, for executing particular vehicle control. Examples of control instructions for the target vehicle include an instruction for prohibiting the driving of the engine 12 in the geofencing zone (engine driving-prohibited instruction) and an instruction for permitting the driving of the engine 12 outside the geofencing zone (engine driving-permitted instruction), control of hiding power feeding devices in the charging-prohibited zone from display, and so forth.

In the second embodiment, the vehicle management server 5 acquires the setting information from the zone setting information server 4, and the display control unit 54a controls the display of the HMI 34 regarding the power feeding devices in the charging-prohibited zone. Specifically, the display control unit 54a executes the processing shown in FIG. 5, performs settings to hide from display the power feeding devices located in the region corresponding to the charging-prohibited zone, and outputs an instruction to each vehicle 3A to control the display. In each vehicle 3A, the power feeding devices in the region corresponding to the charging-prohibited zone are hidden from display on the HMI 34, in accordance with the received instruction.

In the second embodiment described above, the power feeding devices in the region corresponding to the zone (here, the charging-prohibited zone) set in accordance with the risk of damage are hidden from display on the HMI 34, so that the driver or the like does not recognize the power feeding devices located in this zone, in the same way as in the first embodiment. According to the second embodiment, in a zone where there is a danger of a tsunami, for example, the driver or the like can be kept from staying in the zone due to stopping the vehicle 3A for charging. As a result, a situation of becoming engulfed while charging the battery when a disaster occurs can be suppressed.

Further, in the second embodiment, the display control unit Ma collectively instructs the multiple vehicles 3A to perform settings to hide from display the power feeding devices, and accordingly there is no need for each vehicle 3A to execute the processing for display control. Thus, the processing load on the vehicle 3A can be reduced, and the battery 13 of the vehicle 3A can be suppressed from being drained.

Note that in the first and second embodiments described above, the disaster information server 2 can detect weather information based on information posted on a posting site on the Internet or information transmitted by a public institution such as a local municipality, for example. For example, when using information posted on a posting site on the Internet, the disaster information server 2 detects the information over the network NW. Specifically, a configuration may be made in which information indicating rainfall is detected based on words posted on a social networking service (SNS) on the Internet or words frequently tweeted (registered trademark) on a certain day.

Further, the HMI 34 is not limited to an automotive navigation system, and may be any device having a function of conveying information to the driver using sight, hearing, or perception of the driver. For example, the HMI 34 may be audio equipment such as an audio device capable of notification by sound, or a device that generates vibration in the driver's seat of the vehicle 3.

Also, although an example in which the vehicle 3 is provided with the motor 11 and the engine 12, and the vehicle 3 is driven by using at least one of the motor 11 and the engine 12 has been described, the vehicle 3 may include only the motor 11 and always travel by driving of the motor 11.

Further, in the first and second embodiments, an example in which the charging-prohibited zone is set in the geofencing zone has been described, but this is not restrictive, and a region including the outside of the geofencing zone may be set to the charging-prohibited zone.

Recoding Medium

In an embodiment, a program capable of executing a processing method by the control system can be recorded in a recording medium that is readable by a computer or some other machine or device (hereinafter referred to as "computer or the like"). The computer or the like functions as the control units of each device of the control system by the computer or the like being caused to read the program stored in the recording medium and to execute the program. Here, the recording medium that is readable by the computer or the like means a non-transitory recording medium that can accumulate information such as data and programs through electrical, magnetic, optical, mechanical, or chemical action, and read the information from the computer or the like. Of such recording media, examples of recording media that are detachable from the computer or the like include a flexible disk, a magneto-optical disk, a compact disc read-only memory (CD-ROM), a compact disc rewritable (CD-R/W), a digital versatile disc (DVD), a Blu-ray (registered trademark) disc (BD), digital audio tape (DAT), magnetic tape, a memory card such as flash memory, and so forth. Also, examples of recording media that are fixed to the computer or the like include a hard disk, read-only memory (ROM), and so forth. Further, a solid state drive (SSD) can be used as a recording medium that is detachable from the computer or the like or as a recording medium that is fixed to the computer or the like.

Other Embodiments

In a control system according to an embodiment, the term "unit" can be read as "circuit" or the like. For example, the communication unit can be read as "communication circuit".

Also, a program to be executed by each device of the control system according to an embodiment may be configured to be stored in a computer connected to a network such as the Internet or the like, and to be provided by downloading over the network.

Further effects and modifications can be easily derived by those skilled in the art. Broader aspects of the present disclosure are not limited to the particular details and representative embodiments shown and described above. Accordingly, various modifications may be made without departing from the spirit and scope of the general concept of the disclosure defined by the appended claims and their equivalents.

What is claimed is:

1. A setting device, comprising a processor configured to, when occurrence of a secondary disaster is predicted after occurrence of a disaster, set a region in which the secondary disaster is predicted to a charging-prohibited zone in which use of a charging facility for charging a battery installed in a vehicle is prohibited.

2. The setting device according to claim 1, further comprising a transmitting circuit, wherein the processor is configured to control the transmitting circuit to transmit information regarding the charging-prohibited zone to the vehicle.

3. The setting device according to claim 1, further comprising a transmitting circuit, wherein the processor is configured to control the transmitting circuit to transmit information regarding the charging-prohibited zone to a vehicle management server that manages a plurality of the vehicles.

4. The setting device according to claim 1, wherein the processor is configured to set the charging-prohibited zone in a geofencing zone in which traveling of the vehicle is restricted to traveling under power of a motor driven by the battery installed in the vehicle.

5. The setting device according to claim 1, wherein the processor is configured to set the charging-prohibited zone when prediction is made for occurrence of water damage due to a traveling lane in which the vehicle travels being flooded as the secondary disaster.

6. A display control device that is configured to control display content of a display device installed in a vehicle, the display control device comprising a processor that is configured to control the display content displayed on the display device regarding information of, out of charging facilities for charging a battery installed in the vehicle, one or more of the charging facilities that are located in a charging-prohibited zone set in a region where occurrence of a secondary disaster is predicted after a disaster occurs.

7. The display control device according to claim 6, wherein the processor is configured to control the display device such that the information of the one or more of the charging facilities that are located in the charging-prohibited zone is hidden from display in map information displayed by the display device.

8. The display control device according to claim 6, wherein the processor is configured to control the display device such that information indicating prohibition of use is additionally displayed upon the information of the one or more of the charging facilities that are located in the charging-prohibited zone.

9. The display control device according to claim 6, wherein the processor is configured to control the display device such that information of the charging facilities is displayed in a list on the display device in descending order of safety.

10. The display control device according to claim 6, wherein the charging-prohibited zone is set in a geofencing zone in which traveling of the vehicle is restricted to traveling under power of a motor driven by the battery installed in the vehicle.

11. A vehicle display control system that is configured to control display content of a display device installed in a vehicle, the vehicle display control system comprising:
a setting device including a first processor configured to, when occurrence of a secondary disaster is predicted after occurrence of a disaster, set a region in which the secondary disaster is predicted to a charging-prohibited zone in which use of a charging facility for charging a battery installed in the vehicle is prohibited; and
a display control device including a second processor configured to control the display content regarding information of, out of charging facilities for charging the battery installed in the vehicle, one or more of the charging facilities that are located in the charging-prohibited zone.

12. The vehicle display control system according to claim 11, wherein the second processor is configured to control the display device such that the information of the one or more of the charging facilities that are located in the charging-prohibited zone is hidden from display in map information displayed by the display device.

13. The vehicle display control system according to claim 11, wherein the second processor is configured to control the display device such that information indicating prohibition of use is additionally displayed upon the information of the one or more of the charging facilities that are located in the charging-prohibited zone.

14. The vehicle display control system according to claim 11, wherein the second processor is configured to control the display device such that information of the charging facilities is displayed in a list on the display device in descending order of safety.

15. The vehicle display control system according to claim 11, wherein the first processor is configured to set the charging-prohibited zone in a geofencing zone in which traveling of the vehicle is restricted to traveling under power of a motor driven by the battery installed in the vehicle.

16. The vehicle display control system according to claim 11, wherein:
the display control device is provided in the vehicle;
the setting device includes a transmitting circuit; and
the first processor is configured to control the transmitting circuit to transmit information regarding the charging-prohibited zone to the display control device.

17. The vehicle display control system according to claim 11, further comprising a vehicle management server that manages a plurality of the vehicles, the display control device being provided in the vehicle management server, wherein:
the setting device includes a transmitting circuit, and is configured to control the transmitting circuit to transmit information regarding the charging-prohibited zone to the vehicle management server; and
the vehicle management server is configured to transmit a signal for controlling the display content of the display device of each vehicle of the vehicles to be managed.

18. The vehicle display control system according to claim 11, wherein the first processor is configured to set the charging-prohibited zone when prediction is made for occurrence of water damage due to a traveling lane in which the vehicle travels being flooded as the secondary disaster.

19. The vehicle display control system according to claim 18, wherein:
the secondary disaster is a tsunami; and
the first processor is configured to set the charging-prohibited zone so as to include a region where the tsunami is expected to reach.

20. The vehicle display control system according to claim 11, wherein:
the vehicle includes an internal combustion engine and a motor driven by the battery.

* * * * *